United States Patent
Banerjee et al.

(10) Patent No.: US 9,950,311 B2
(45) Date of Patent: Apr. 24, 2018

(54) PROCESS FOR THE SYNTHESIS OF MAGNETICALLY RECOVERABLE, HIGH SURFACE AREA CARBON-$FE_3O_4$ NANO-COMPOSITE USING METAL ORGANIC FRAMEWORK (MOF)

(71) Applicant: COUNCIL OF SCIENTIFIC & INDUSTRIAL RESEARCH, New Delhi (IN)

(72) Inventors: Abhik Banerjee, Maharashtra (IN); Satishchandra Balkrishna Ogale, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 790 days.

(21) Appl. No.: 14/360,588

(22) PCT Filed: Nov. 23, 2012

(86) PCT No.: PCT/IN2012/000765
§ 371 (c)(1),
(2) Date: May 23, 2014

(87) PCT Pub. No.: WO2013/076742
PCT Pub. Date: May 30, 2013

(65) Prior Publication Data
US 2014/0319062 A1    Oct. 30, 2014

(30) Foreign Application Priority Data
Nov. 25, 2011 (IN) .......................... 3382/DEL/2011

(51) Int. Cl.
B01J 20/28 (2006.01)
B01J 20/30 (2006.01)
(Continued)

(52) U.S. Cl.
CPC .......... B01J 20/3078 (2013.01); B01J 20/06 (2013.01); B01J 20/205 (2013.01);
(Continued)

(58) Field of Classification Search
CPC .............. B01J 20/3078; B01J 20/28061; B01J 20/28009; B01J 2220/46; B01J 20/28054;
(Continued)

(56) References Cited

U.S. PATENT DOCUMENTS

2009/0130411 A1* 5/2009 Chang ...................... B01J 20/02
428/219
2011/0067426 A1* 3/2011 Hwang .................. F24F 3/1411
62/271
(Continued)

OTHER PUBLICATIONS

Chu, Y. et al. 2012 "Three-Dimensionally Macroporous Fe/C Nanocomposites as Highly Selective Oil-Absorption Materials" *A C S Applied Materials and Interfaces*, American Chemical Society 4: 2420-2425.
(Continued)

*Primary Examiner* — David C Mellon
(74) *Attorney, Agent, or Firm* — Knobbe, Martens, Olson & Bear, LLP

(57) ABSTRACT

The present invention discloses magnetically recoverable, high surface area carbon-$Fe_3O_4$ nanocomposite prepared by thermolysis of metal organic framework useful for recovery of oil, dyes and pollutants. Also disclosed are methods of removing an oleophilic material from a solution by treating the solution with a carbon-$Fe_3O_4$ nanocomposite.

4 Claims, 10 Drawing Sheets

(51) Int. Cl.
| | |
|---|---|
| C02F 1/68 | (2006.01) |
| C02F 1/28 | (2006.01) |
| B01J 20/06 | (2006.01) |
| C02F 1/48 | (2006.01) |
| C01G 49/08 | (2006.01) |
| B01J 20/20 | (2006.01) |
| B82Y 30/00 | (2011.01) |
| C01B 32/00 | (2017.01) |
| C02F 101/30 | (2006.01) |
| C02F 101/32 | (2006.01) |

(52) U.S. Cl.
CPC ... *B01J 20/28009* (2013.01); *B01J 20/28061* (2013.01); *B82Y 30/00* (2013.01); *C01B 32/00* (2017.08); *C01G 49/08* (2013.01); *C02F 1/288* (2013.01); *C02F 1/488* (2013.01); *C02F 1/681* (2013.01); *B01J 2220/46* (2013.01); *C01P 2002/72* (2013.01); *C01P 2004/03* (2013.01); *C01P 2004/04* (2013.01); *C01P 2004/16* (2013.01); *C01P 2004/64* (2013.01); *C01P 2004/82* (2013.01); *C01P 2006/12* (2013.01); *C01P 2006/42* (2013.01); *C02F 2101/308* (2013.01); *C02F 2101/32* (2013.01); *Y10T 428/2982* (2015.01)

(58) Field of Classification Search
CPC ......... B01J 20/06; B01J 20/205; C01B 32/00; B82Y 30/00; C01G 49/08; Y10T 428/2982; C02F 2101/308; C02F 2101/32; C02F 1/488; C02F 1/288; C02F 1/681; C01P 2004/03; C01P 2004/04; C01P 2004/82; C01P 2002/72; C01P 2006/12; C01P 2004/64; C01P 2004/16; C01P 2006/42

See application file for complete search history.

(56) References Cited

U.S. PATENT DOCUMENTS

| | | | |
|---|---|---|---|
| 2012/0049110 A1* | 3/2012 | Trukhan | B01D 53/02 252/182.1 |
| 2014/0200361 A1* | 7/2014 | Lee | B01J 31/1691 556/42 |

OTHER PUBLICATIONS

Lupu, et al. 2011 "Synthesis and hydrogen adsorption properties of a new iron based porous metal-organic framework" *International Journal of Hydrogen Energy* 36: 3586-3592.

Thakuria, P. et al. 2009 "Superparamagnetic Nanocomposite of Magnetite and Activated Carbon for Removal of Dyes from Waste Water" *Nanoscience and Nanotechnology Letters* 1: 171-175.

Yang, N. et al. 2008 "Synthesis and properties of magnetic $Fe_3O_4$-activated carbon nanocomposite particles for dye removal" *Materials Letters* 62: 645-647.

\* cited by examiner

PROCESS FOR THE SYNTHESIS OF MAGNETICALLY RECOVERABLE, HIGH SURFACE AREA CARBON-FE$_3$O$_4$ NANO-COMPOSITE USING METAL ORGANIC FRAMEWORK (MOF)

TECHNICAL FIELD OF THE INVENTION

This invention relates to magnetically recoverable High surface area carbon-Fe$_3$O$_4$ nanocomposite prepared by thermolysis of metal organic framework useful for recovery of oil, dyes and pollutants.

BACKGROUND AND PRIOR ART OF THE INVENTION

Water pollution caused by a) oil spillages, b) leakage of organic hazardous material, c) water soluble dyes, d) weakly biodegradable organic material etc. is one of the major problems for the protection of the environment. Oil as well as many of the organic hazardous chemicals are hydrophobic (oleophilic) in nature and therefore float on the surface of the water. To selectively remove such oleophilic materials, it is desired to have a hydrophobic material, which can strongly adsorb these materials. A number of techniques have already been developed in the state of art to address the oil spillage problem such as (1) hydrophobic sponge, (2) metal meshes fabricated with fatty acid, spray dry process, solution immersion process etc, (3) metal substrate by wet chemical process, (4) membrane, containing self-assembly of co-polymer and polymeric LBL assembly, (5) filter paper, electrospum nanofiber (6) also with activated carbon, zeolites, clays, wool fiber etc.

In order to remove organic pollutants (dyes, Phenol, etc), which are soluble in water, it is required to have a material which can disperse in water. Generally used materials for this purpose include (1) semiconductor material which can photodegrade the organic pollutant in the presence of light, (2) high surface area carbon or carbon based composite, (3) Magnetic materials based high surface area composite, (4) Zeolites or porous silica etc.

Conventional materials used for the oil spillage problem (like sponge, meshes, different membrane, activated carbon, zeolites, clays, wool, fiber etc.) have some limitations such as environmental compatibility, low absorption capacity, and poor recyclability.

Activated carbon has collection problem due to very small particle size and also it has very high temperature regeneration problem. On the other side membranes are not suitable for the large area oil spillage problem and contamination removal from the surface of the water.

Therefore, it has been technologically very challenging to synthesize such materials which can be widely applied to the purification of both the above stated types of water purification issues.

There are reports in the literature on the synthesis of carbon-Fe$_3$O$_4$ composites.

An article titled "Superparamagnetic Nanocomposite of Magnetite and Activated Carbon for Removal of Dyes from Waste Water" by Pankaj Thakuria and Pattayil Alias Joy (NCL) in Nanoscience and Nanotechnology Letters Vol. 1, 171-175, 2009 report the synthesis of Fe$_3$O$_4$-AC nanocomposite at room temperature. According to the process disclosed in said article, dried powdered form of activated carbon black (Vulcan XC-72) was refluxed with 20% nitric acid and 20% sulfuric acid, Ar gas was purged through the mixture for 10 minutes before refluxing. The refluxed mixture was filtered and washed with distilled water several times and finally dried at 60° C. overnight to obtain modified carbon black. Fe$_3$O$_4$ nanoparticles were synthesized by the chemical co-precipitation method wherein FeSO$_4$.7H$_2$O and FeCl$_3$.6H$_2$O were taken in the 1:2 molar ratio and precipitated using 20% ammonia solution under argon atmosphere. Modified carbon black was then sonicated in distilled water for 10 minutes separately and added to the remaining precipitated solution and stirred. The pH of the solution was brought from 13 to neutral by slow addition of dil. HNO$_3$ while stirring. The final product was isolated with a permanent magnet several times to wash out unattached carbon black.

An article titled "Synthesis and properties of magnetic Fe$_3$O$_4$-activated carbon nanocomposite particles for dye removal" by Yang; Na; Zhu; Shenmin; Zhang; Di; Xu et. al in Materials Letters, vol 62, issue 4-5, pgs 645-647 relate to magnetic Fe$_3$O$_4$-activated carbon nanocomposite synthesized from rice husk based activated carbon.

An article titled "Three-dimensionally macroporous Fe/C nanocomposites as highly selective oil-absorption materials" by Chu Y, Pan Q in ACS Appl Mater Interfaces. 2012 May; 4(5):2420-5 discloses three-dimensionally macro porous Fe/C nanocomposites synthesized by sintering a mixture of closely packed polystyrene micro spheres and ferric nitrate precursor.

Preparation and Supercapacitive Properties of Fe$_2$O$_3$/Active Carbon Nano composites" by LUO Pei-wen, YU Jian-guo et. al in Chem. Res. Chinese universities 2012, 28(5), 780-783 disclose synthesis of Fe$_2$O$_3$/AC nanocomposites. The process includes fabricating Fe$_2$O$_3$/AC nanocomposite by heating the Fe$_{3+}$ impregnated AC in a N$_2$ flow. Commercial activated carbon (AC) (Vulcan-32) was modified by HNO$_3$ (63%, mass fraction) for 3 h at 80° C. to make it hydrophilic. This was followed by dispersing modified AC and Fe(NO$_3$)$_3$.9H2O in H$_2$O. After vigorously stirring and ultrasonicating for 1 h, the mixture was filtered and dried. The dried filter residue was then heated at 750° C. for 3 h in a N$_2$ flow to obtain the desired product.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

However, the prior art methods do not disclose the preparation of Fe-based carbon composites with high surface area and high absorptive properties from the metal organic frameworks.

In view of the above, there is a need in the art to provide simple and scalable method of preparation Magnetic carbon composites with very high surface area starting from a Metal organic framework that can be widely applied to the purification of both the above stated types of water purification issues.

OBJECTS OF THE INVENTION

Main object of the present invention is to provide magnetically recoverable High surface area carbon-Fe$_3$O$_4$ nanocomposite prepared by thermolysis of metal organic framework useful for recovery of oil, dyes and pollutants.

SUMMARY OF THE INVENTION

In accordance with the object of the invention, the present invention provides a process for the synthesis of magnetically recoverable, high surface area carbon-$Fe_3O_4$ nanocomposite, comprising, subjecting Fe-benzene dicarboxylic acid (BDC) metal organic framework to pyrolysis in an inert atmosphere at a temperature range of 500° C. to 600° C. to obtain hydrophobic magnetic carbon nanocomposite.

In another aspect, the present invention discloses magnetic carbon-$Fe_3O_4$ nanocomposite obtained at 500° C. which is floatable on water and which can selectively adsorb oil and hydrophobic organic pollutants from the surface of the water.

In yet another aspect, the present invention discloses magnetic carbon-$Fe_3O_4$ nanocomposite obtained at 600° C. which is easily dispersible into bulk of water with little stirring and which can selectively adsorb water soluble organic pollutants.

In another aspect, MOF derived porous carbon-$Fe_3O_4$ nanocomposite of the present invention exhibits high performance, recyclable environmental super adsorbent.

In a further embodiment of the invention wherein said magnetic carbon-$Fe_3O_4$ nanocomposite has BET surface area 437.8 $m^2/g$.

In yet another embodiment of the invention wherein said magnetic carbon-$Fe_3O_4$ nanocomposite has magnetism value in the range of 26 emu/g to 49 emu/g.

In still further embodiment of the invention wherein the contact angle of the magnetic carbon-$Fe_3O_4$ nanocomposite is 143° (pH=7).

In one more embodiment of the invention, wherein the magnetic carbon-$Fe_3O_4$ nanocomposite is in the form of rods.

Magnetically recoverable, carbon-$Fe_3O_4$ nanocomposite prepared by the process characterized by having BET surface area 437.8 $m^2/g$, magnetism value in the range of 26 emu/g to 49 emu/g and with contact angle of 143° (pH=7).

Use of Magnetically recoverable, carbon-$Fe_3O_4$ nanocomposite characterized by having BET surface area 437.8 $m^2/g$, magnetism value in the range of 26 emu/g to 49 emu/g and with contact angle of 143° (pH=7), for recovery of oil, dyes and pollutants.

Method of removing oleophilic materials in water bodies by treating the polluted water bodies with Magnetically recoverable, carbon-$Fe_3O_4$ nanocomposite characterized by having BET surface area 437.8 $m^2/g$, magnetism value in the range of 26 emu/g to 49 emu/g and with contact angle of 143° (pH=7).

Various objects, features, aspects and advantages of the inventive subject matter will become more apparent from the following detailed description of preferred embodiments, along with the accompanying drawing figures in which like numerals represent like components.

DETAILED DESCRIPTION OF THE INVENTION

Figure 1:
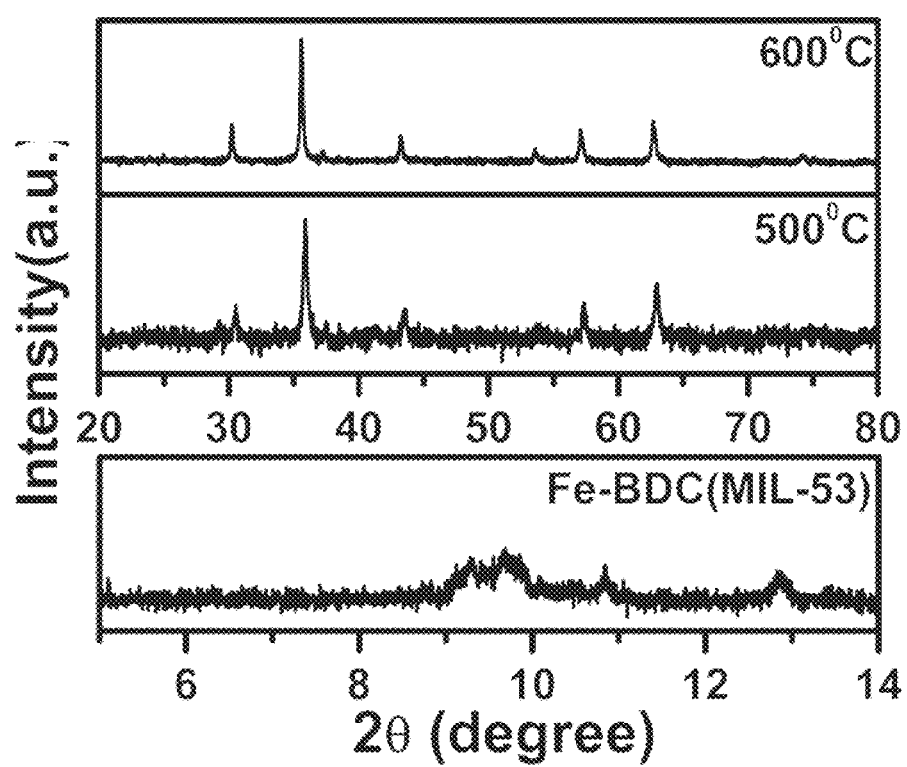
FIG. 1: shows PXRD image of the magnetic carbon-$Fe_3O_4$ nanocomposite.

The invention will now be described in detail in connection with certain preferred and optional embodiments, so that various aspects thereof may be more fully understood and appreciated.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In some embodiments, the numbers expressing quantities of ingredients, properties such as concentration, reaction conditions, and so forth, used to describe and claim certain embodiments of the invention are to be understood as being modified in some instances by the term "about". Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In view of the foregoing, the present inventors have come up with a novel way to synthesize Magnetic carbon-$Fe_3O_4$ nanocomposites with very high surface area starting from a Metal organic framework (MOF), which can solve any type of water pollution problems.

Use of Iron and Benzene dicarboxylic acid (BDC) based metal organic framework (MOF) is the key to the synthesis of the porous magnetic carbon-$Fe_3O_4$ nanocomposite with very high surface area. The hydrophobicity of the nanocomposite can be tuned by thermolysis of the nanocomposite under different conditions. These nanocomposites can adsorb the pollutants from the surface as well as bulk from the water according to the degree of their hydrophobocity. Very high surface area provides good adsorption capacity of these nanocomposites. Since the nanocomposite is magnetic, after adsorbing the pollutants it can be easily separated by application of the magnetic field. Adsorbed oil can be removed by easily sonicating the oil-adsorbed nanocomposite in ethanol. In the case of water-soluble pollutants after getting adsorbed by the nanocomposite, it can get released in ethanol. This ethanol can be evaporated out to get the organic pollutants for reuse. These nanocomposites thus show very good recyclability.

Accordingly, in a preferred embodiment, an Iron based metal organic framework comprising the metal such as iron (Fe) and benzene dicarboxylic acid (BDC) is used as a precursor material, which is subjected to simple pyrolysis in inert atmosphere at temperature in the range of 500° to 600°, to yield hydrophobic Magnetic carbon-$Fe_3O_4$ nanocomposites. The one synthesized at lower temperature (500° C.) is designated as hydrophobic and other one synthesized at higher temperature (600° C.) is designated as less hydrophobic. The hydrophobic nanocomposite obtained at 500° C. according to the invention have floating properties on the surface of the water whereas hydrophobic nanocomposite obtained at 600° C. is observed to be easily dispersed into bulk of water even with little stirring.

The hydrophobic magnetic carbon-$Fe_3O_4$ nanocomposite according to the invention can selectively adsorb oil and hydrophobic organic pollutants from the surface of the water while the less hydrophobic form can adsorb water-soluble organic pollutants from the bulk of the water. Since both types of nanocomposites are magnetic, it is easier to separate the nanocomposites after adsorbing the pollutants by application of magnetic field. Therefore, the process of the instant invention provides a scalable way by which one can synthesize porous magnetic carbon-$Fe_3O_4$ nanocomposite that can be potentially very important for water purification. The applicability of these materials could be extended easily to other domains as well.

Thus in a preferred embodiment, the present invention relates to a process for the synthesis of magnetically recoverable, high surface area carbon nano-composite, comprising, subjecting Fe-benzene dicarboxylic acid (BDC) metal organic framework to pyrolysis in an inert atmosphere at a temperature range of 500° C. to 600° C. to obtain hydrophobic magnetic carbon nanocomposite.

Fe-BDC Metal organic framework was prepared by reacting a solution of $FeCl_3$ (98%) and Terephthalic acid (98%) in Dimethyl Formamide in Teflon liner steel autoclave by a process known in the art to obtain $Fe_3O_4$-carbon composite systems (MOF).

The magnetic nanocomposites of the instant invention show high oil adsorption capacity compared to the other conventional methods and also it releases the oil just by sonication in ethanol. The nanocomposite can then again be re-used for the oil spillage problem.

In another embodiment, the invention provides the characterization of Magnetic carbon nanocomposites, $Fe_3O_4$-carbon. In X ray diffraction all the diffracted peaks relate with the Face centre cubic (FCC) lattice of $Fe_3O_4$. Other peaks related with the hematite phase and Iron hydroxide was not obtained from the XRD measurement. Also no XRD peaks regarding the carbon indicate the highly amorphous nature of the carbon as shown in FIG. 1.

Figure 2:
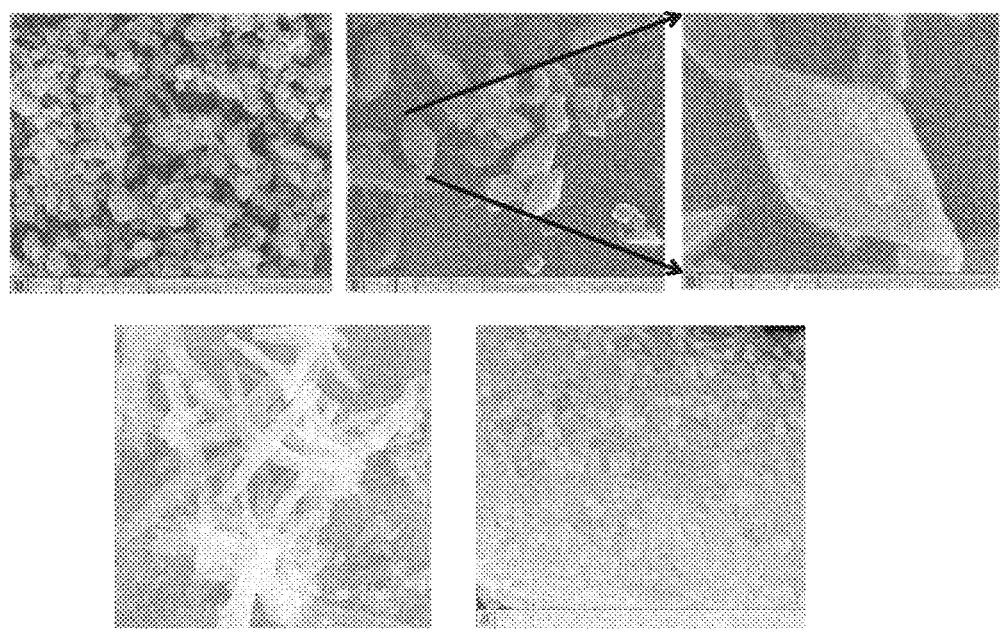
FIG. 2: shows the SEM images of Fe-BDC framework and magnetic carbon nanocomposites.
Figure 3:
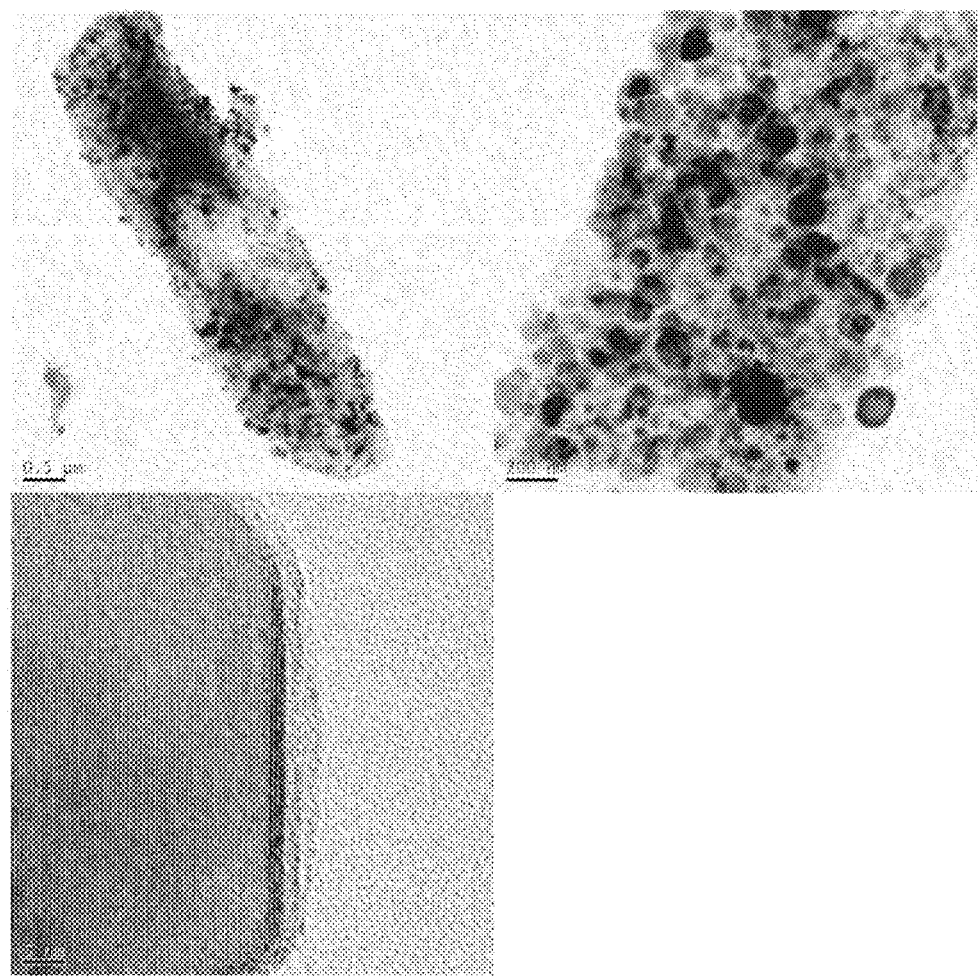
FIG. 3: shows the SEM images of Fe-BDC framework and magnetic carbon nanocomposites FIGS. 4, (A) and (B): magnetism study of the carbon-$Fe_3O_4$ nanocomposites synthesized at different temperature.

The morphology of the nanocomposite is investigated by Scanning Electron Microscopy (SEM) and high resolution transmission electron microscopy (HRTEM) (FIGS. 2 and 3). The SEM image of the Fe-BDC mostly showing the rhombohedral type morphology along with some semi-spherical and spherical shape with width or radius ranging from 500 to 900 nm and the length from 1 to 2.5 micron whereas the magnetic nanocomposite is rod like morphology. In these rods the 50 nm $Fe_3O_4$ particle embedded into the carbon matrix. In TEM also we got porous carbon network where $Fe_3O_4$, particles embedded into the matrix.

Figure 4:
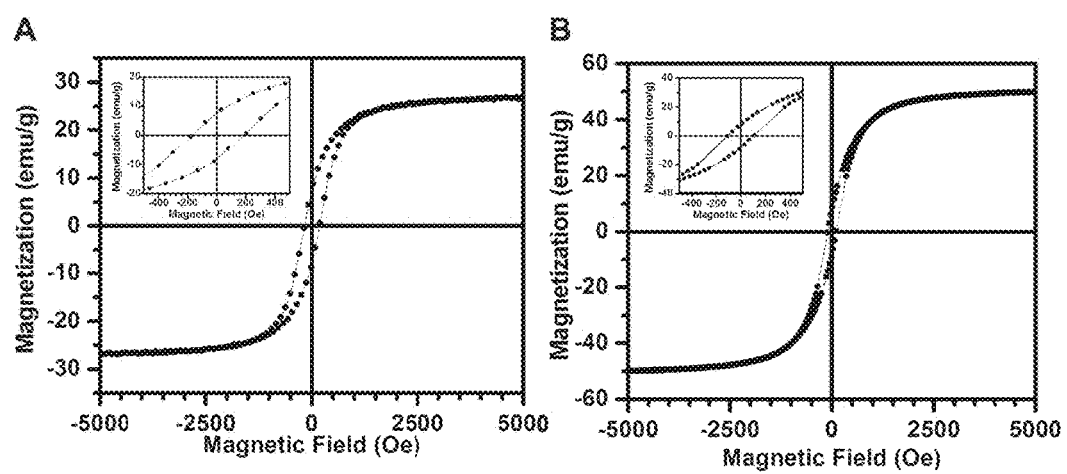
Figure 5:
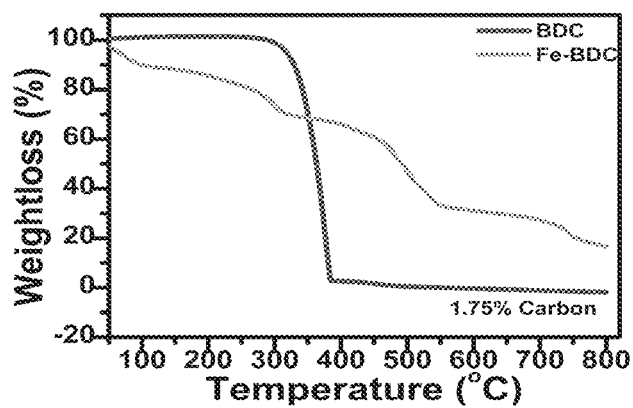
FIG. 5: TGA study of the BDC and Fe-BDC metal organic framework a temperature range from 500 to 600° C.

The magnetism study was done by squid magnetometer. The magnetism study of both $Fe_3O_4$-carbon nanocomposites shows typical hysteresis behavior characteristics of the ferromagnetism at room temperature as shown in FIG. 4. The magnetism value of the nanocomposite synthesized at 500 degree temperature is less (26 emu/g) compared to the synthesized at temperature 600° Celsius (49 emu/g). This may be because of the removing of the carbon from the nanocomposite at higher temperature heating which is also being confirmed from the thermo gravimetric analysis. The TGA study of BDC as well as the Metal Organic Framework in argon atmosphere at temperature range of 500° C. to 700° C. are shown in FIG. 5. In the case of only BDC, degradation starts from temperature 291° C. and it degrades fully at 390° C. and only 1.75% of remaining carbon. But in case of Fe-BDC, it degrades with multiple steps. Initial weight loss is observed because of removal of adsorbed solvent molecule from the framework and then degradation at 290° C. occurs because of the decomposition of the BDC in the network and start forming the magnetic nanoparticles and also the amorphous carbon. At the temperature 500°, the weight loss is around 54% and at temperature 600°, it degrades 84% of the initial weight. So, 30% of the weight decreases from temperature 500 to 600 degree which is almost comparable with magnetism value increases 24 emu/g. The magnetism value is less than typical magnetism value obtained from the 50 nm $Fe_3O_4$ nanoparticle, which is due to highly amorphous carbon coating on the surface of the $Fe_3O_4$ nanoparticle which reduced the alignment (magnetic coupling) of magnetic spin.

Accordingly, the magnetic carbon-$Fe_3O_4$ nanocomposite of the present invention has magnetism value in the range of 26 emu/g to 49 emu/g.

Figure 6:
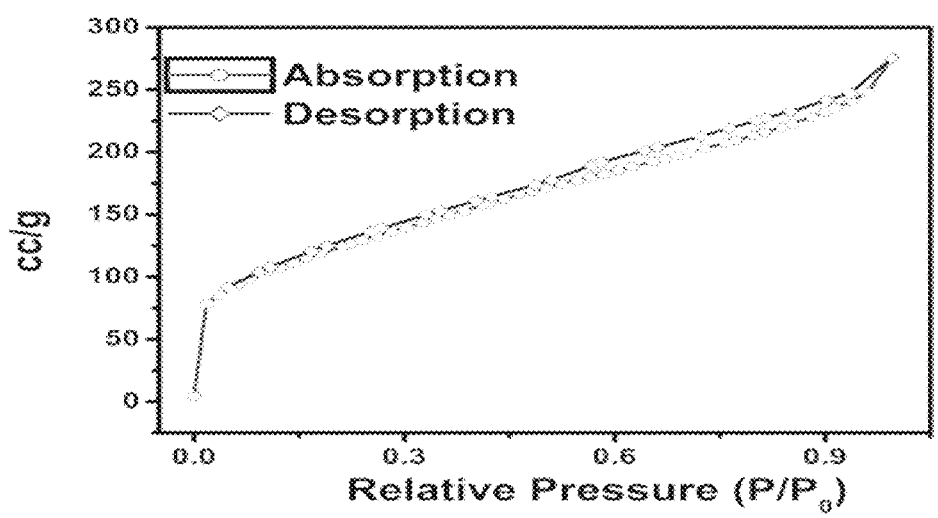
FIG. 6: BET Absorption Isotherm of carbon-$Fe_3O_4$ nanocomposite.

Brunauer-Emmett-Teller (BET) gas-adsorption experiments were performed to investigate the Specific surface area. The specific surface area of the BET isotherm is 437.8 m²/g. The BET surface area is shown in FIG. 6.

Figure 7:
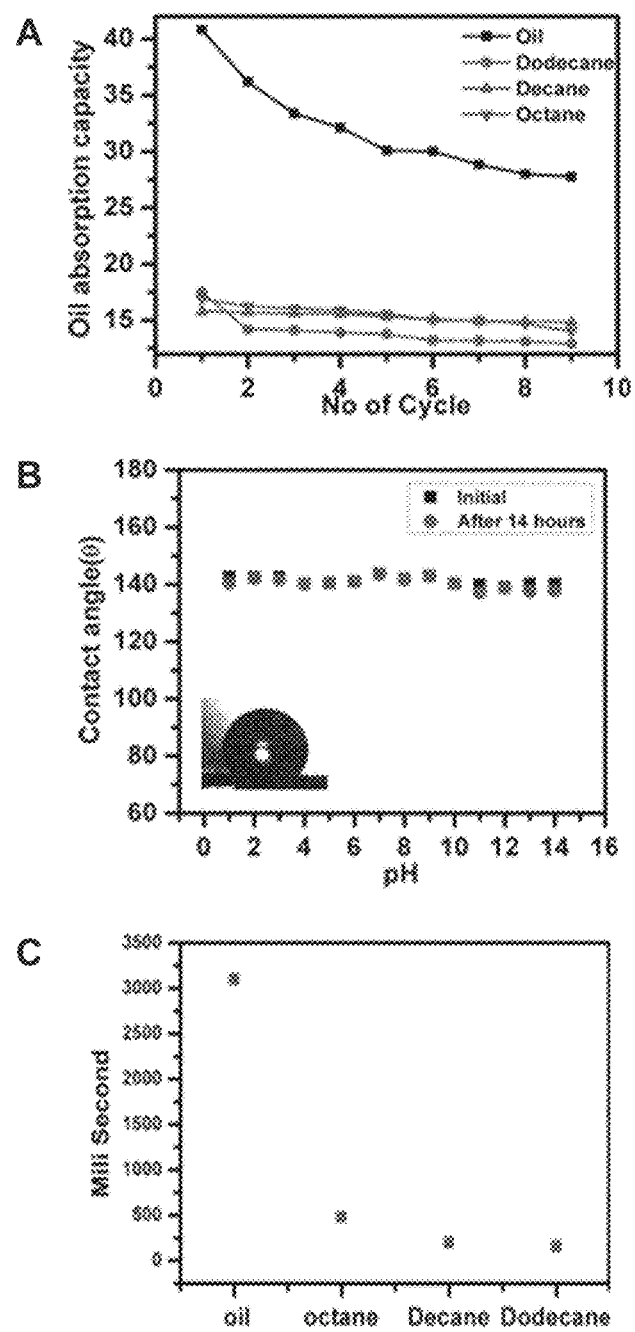
FIG. 7, (A) Oil adsorption capacity of oil and hydrocarbon after 9 cycles, (B) pH dependent water contact angle measurement value, keeping after 14 hours, and (C) the wettability of the oil and the hydrocarbon by dynamic contact angle measurement.

Water contact angle study of the hydrophobic nanocomposite shown in FIG. 7, where 5 microliter drop added on a film of the nanocomposite which shows contact angle 143 (pH=7) that means nanocomposite is hydrophobic in nature.

In another embodiment, the evaluation of the stability of the hydrophobicity in different pH (1-14) as well as 0.1 M NaCl solution was conducted, which showed no significant changes in contact angle besides pH 1, 3, 11, 13 and 14 slides reduced in the contact angle. In a further embodiment, the evaluation of the oleophilicity of the nanocomposite with oil and different hydrocarbon with dynamic contact angle measurement was carried, which shows high affixation of the nanocomposite with the oil and hydrocarbon as they become easily adsorbed on the surface is shown in FIG. 7.

All of the above results clearly indicate that the carbon-$Fe_3O_4$ nanocomposite is suitable for the oil and hydrocarbon separation from the water. The nanocomposite when added on the lubricant oil got immediately dispersed on the oil surface and adsorbed the oil quickly as it repeals the water. The oil adsorbed nanocomposite was separated by the magnetic field by using a bar magnet. Oil adsorbent capacity (k) was around 40 for lubricant oil and relatively less for hydrocarbon is shown in FIG. 7. For the recyclability of the material, oil adsorbed nanocomposite was sonicated into the ethanol for 5 minutes and separated by bar magnet and again sonicated into ethanol for 1 minute and separated in same way and dried in the oven. Oil adsorption capacity of the nanocomposite (k) was carried out with lubricant oil and other three hydrocarbon (octane, Decane and Dodecane) continuously up to nine cycles to check the recyclability of the materials was shown in FIG. 7. It has been observed that in the case of lubricant oil it adsorbs almost 40 times more oil of its own weight but in the case of other hydrocarbon it is somehow less (around 17 for dodecane, 16 for decane and 15 for octane). However, after nine cycles the adsorption capacity goes down to 28 for the lubricant oil but on the other side hydrocarbons showed consistency to their up taking capacity with only slight reduction in their value.

Figure 8:
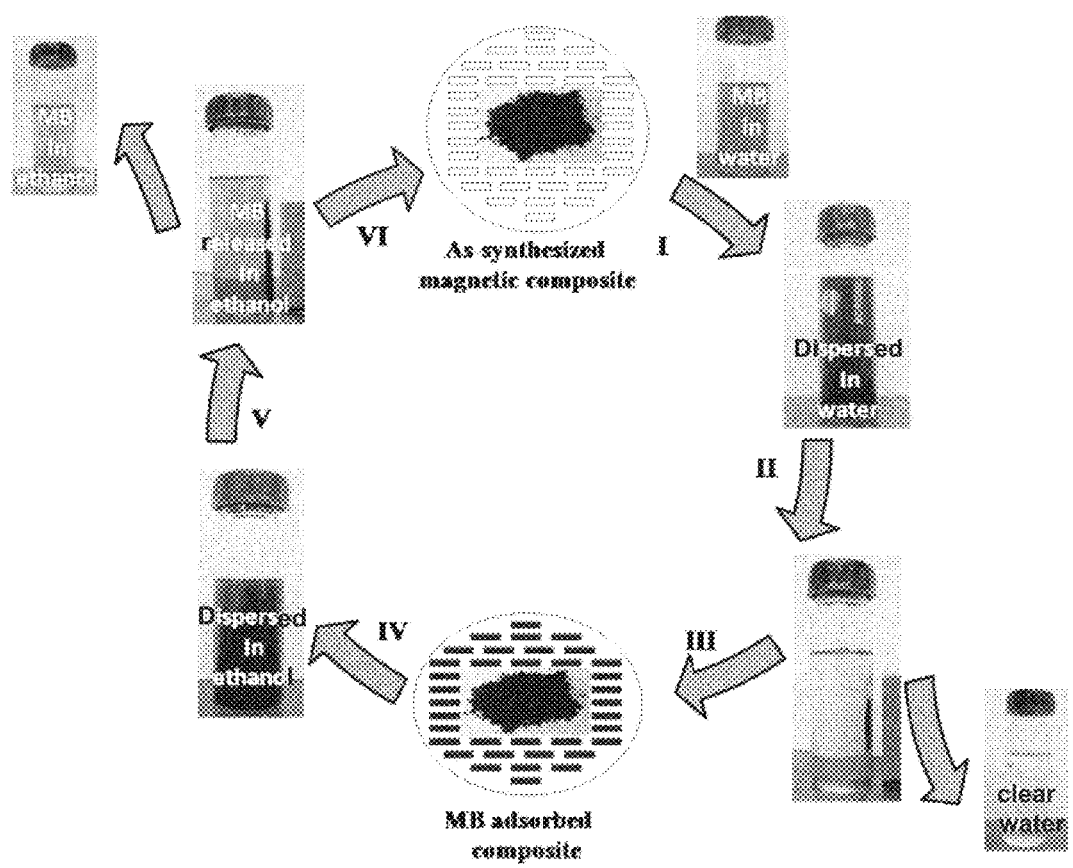
FIG. 8: The total cycle for regeneration of methylene blue dye as well as water purification
Figure 9:
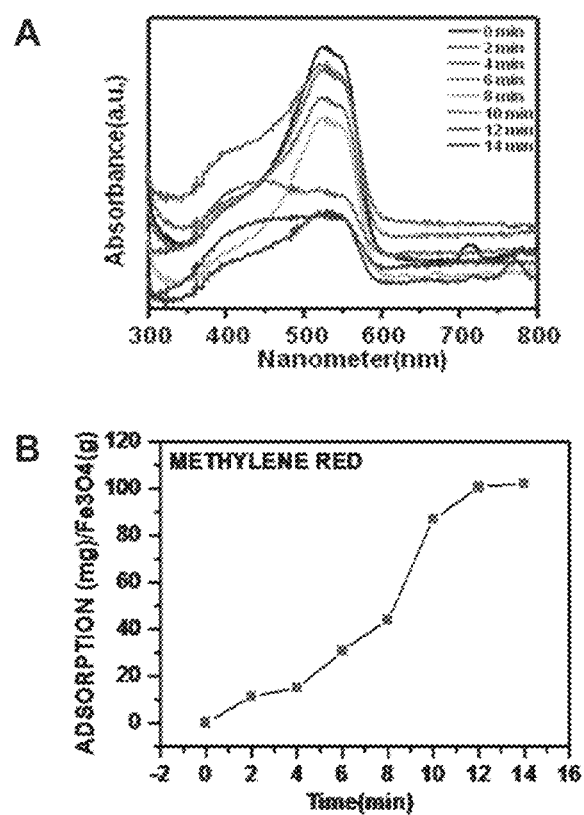
FIG. 9: Relative decrease in the intensity of adsorption of methylene red. (A) absorbance (a.u.) and (B) Adsorption (mg)/$Fe_3O_4$.
Figure 10:
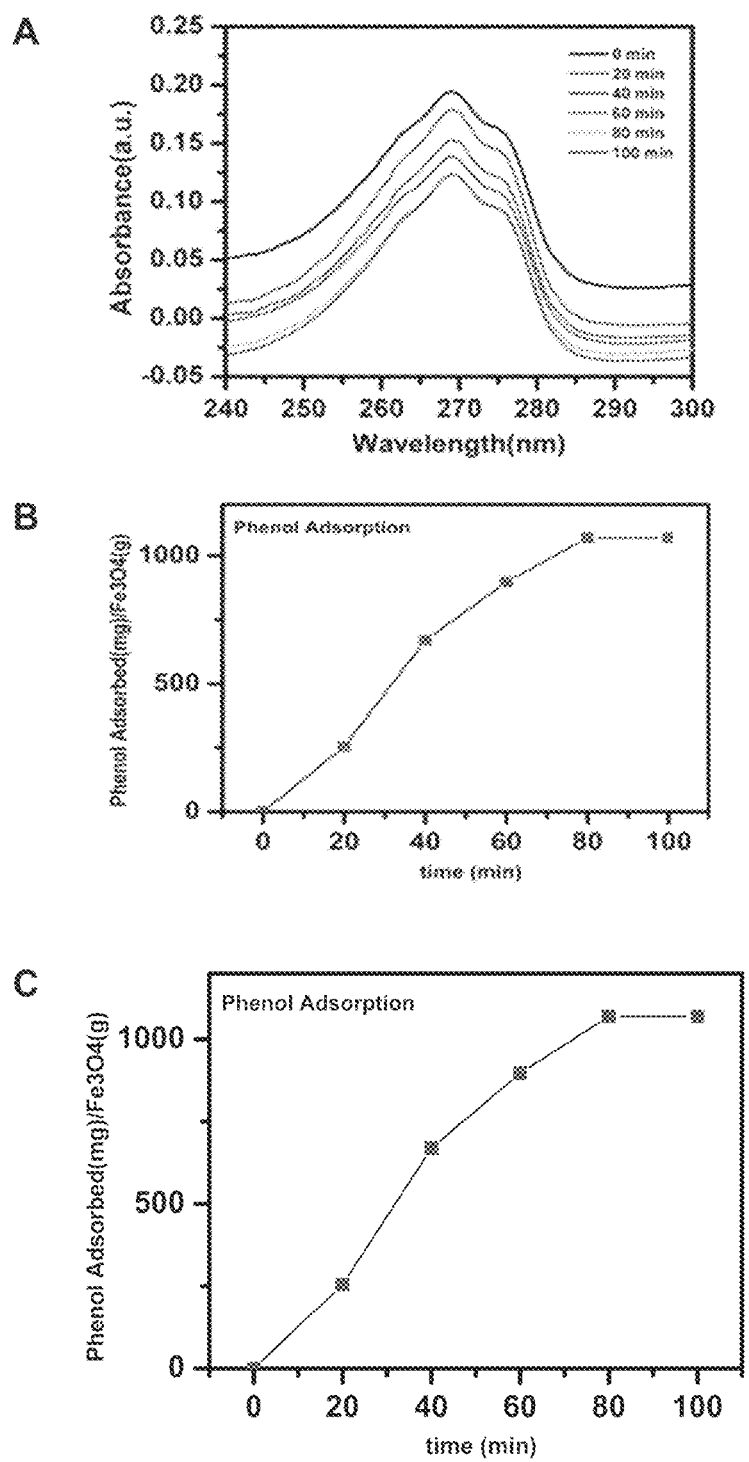
FIG. 10: Relative decrease in the intensity of the adsorption of Phenol. (A) Absorbance (a.u.). (B) and (C) Phenol Absorbed (mg)/$Fe_3O_{4(g)}$.
Figure 11:
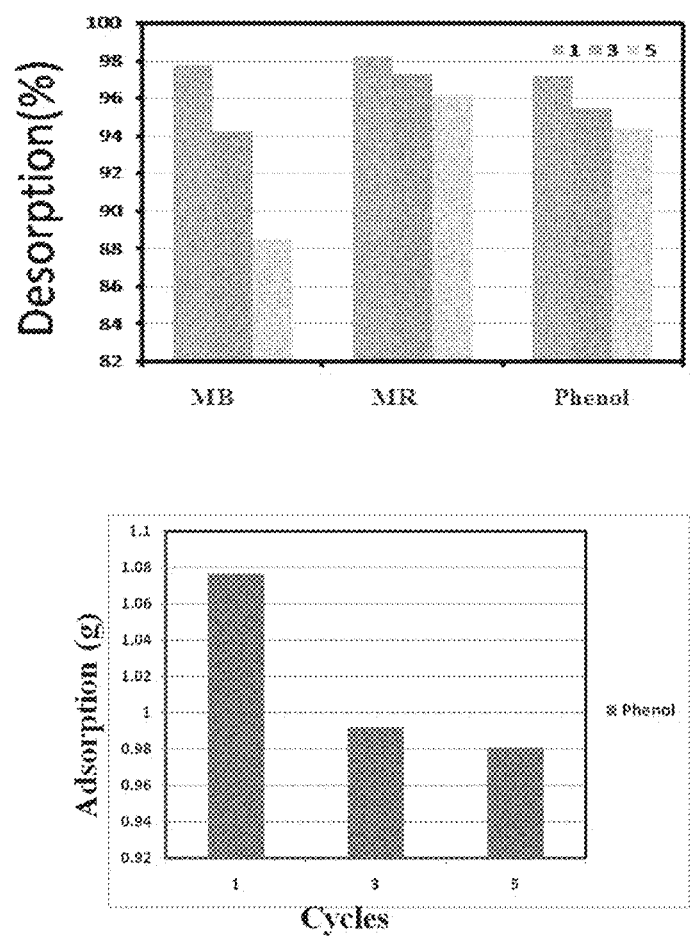
FIG. 11: Adsorption and desorption cycles up to 5 times of dyes and Phenol.

In another embodiment, the magnetic carbon-$Fe_3O_4$ nanocomposite synthesized at higher temperature exhibited less hydrophobicity and dispersed easily in water even by little stirring. The activity of the less hydrophobic synthesized magnetic carbon-$Fe_3O_4$ nanocomposite was checked for purification of dye polluted water (polluted by Methylene Blue, methylene red and weakly bio-degradable organic pollutant like phenol). The nanocomposite showed very good adsorption capacity for various dyes as well as phenol (65 mg/gm for methylene blue, 100 mg/gm for methylene red, 445 mg/gm for phenol. Further, when the dye adsorbed magnetic nanocomposite was dispersed in ethanol, the dye was released from the magnetic nanocomposite and it got dissolved in ethanol. The solid dyes and phenol could be recovered back by simply evaporating the ethanol. The total cycle for regeneration of methylene blue dye and nanocomposite is shown FIG. 8. In the first (1) step of the cycle, the nanocomposite is added to the dye polluted water and stirred, (2) the dye adsorbed magnetic carbon nanocomposite is separated by a bar magnet from the water dispersion, (3) separately collected the dye adsorbed magnetic carbon nanocomposite and the dye pollutant free water, (4) re-dispersed the dye adsorbed magnetic nanocomposite into the ethanol to release the dye from the magnetic nanocomposite, (5) again separated the magnetic nanocomposite by a bar magnet from the dye solution in ethanol (6) dried the magnetic nanocomposite at 600° C. in vacuum. This recovered magnetic nanocomposite can be reused. The dye can also be recovered from the ethanol solution by evaporation. So, in this complete cycle of water purification other than the water being purified, both the magnetic nanocomposite and the dye were regenerated and can be reused further.

In an embodiment, the present invention provides Magnetically recoverable, carbon-Fe3O4 nano-composite prepared by the process of the instant invention characterized by having BET surface area 437.8 m²/g, magnetism value in the range of 26 emu/g to 49 emu/g and with contact angle of 143° (pH=7).

Magnetic carbon nanocomposite of the present invention has wide industrial applications other than water purification, including for capacitor application as well as Li ion battery. Thus the material can be used in different energy related applications. Further, one can tune the carbon amount as well as surface area by using the polymerization of furfuryl alcohol into the pores of the MOF and then thermolytically cracking it at high temperature in inert condition.

In another preferred embodiment, the invention provides the adsorption capacity for oil and other organic hydrocarbon up to 8 cycles. The pollutant adsorption property of this nanocomposite is also very high. The magnetic nanocomposites of the invention have been tested for the removal of methylene red dye and organic harmful pollutant like phenol and in both cases it showed good recyclability.

In another embodiment, the present invention provides the use of Magnetically recoverable, carbon-Fe3O4 nano-composite characterized by having BET surface area 437.8 m²/g, magnetism value in the range of 26 emu/g to 49 emu/g and with contact angle of 143° (pH=7), for recovery of oil, dyes and pollutants.

In yet another embodiment, the present invention relate to a method of removing oleophilic materials in water bodies by treating the treating the polluted water bodies with Magnetically recoverable, carbon-$Fe_3O_4$ nanocomposite characterized by having BET surface area 437.8 m²/g, magnetism value in the range of 26 emu/g to 49 emu/g and with contact angle of 143° (pH=7).

The following discussion provides many example embodiments of the inventive subject matter, which are given by way of illustration and therefore should not be construed to limit the scope of the invention. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

EXAMPLES: MATERIALS AND METHODS $FeCl_3.6H_2O$ (97%) and Benzene Dicarboxylic acid (98%) were procured from Sigma Aldrich, and Dimethyl Formamide (GR) was procured from Merck. All the chemicals were used directly without further purification.

Various Characterization techniques such as UV Visible spectroscopy (JASCO V-570 spectrophotometer), X-ray diffraction (XRD, Philips X'Pert PRO), High-Resolution Transmission Electron Microscopy (HR-TEM, FEI Tecnai 300), Scanning electron microscopy (SEM) with Energy-dispersive x-ray spectroscopy (EDX) (FEI Quanta 200 3D), BET surface area measurements (Quantachrome Quadrasorb automatic volumetric instrument), were used for the determination of various properties of the nanocomposites of the invention. Magnetism measurements were performed using SQUIDVSM magnetometer (Quantum Design).

Example 1: Preparation of Fe-Metal Organic Framework and $Fe_3O_4$-Carbon Composite Fe-BDC Metal organic framework was prepared by reacting a solution of FeCl3 (1 mmol, Sigma Aldrich, 98%) and Terephthalic acid (1 mmol, 1,4-BDC; Aldrich, 98%) in 5 ml Dimethyl Formamide (Merck, 99%) in a 23 ml Teflon liner steel autoclave at a temperature 150° C. for 2 hours. After cooling down the reaction mass to room temperature, a yellow precipitate was obtained. This precipitate was separated by centrifugation at 5000 to 6000 rpm for 5 minutes. To remove the residual solvent, 1 gm of the powder was suspended into 500 ml water and kept for a day. It was then centrifuged in water and dried in vacuum at 60° C. for 24 hours to obtain the $Fe_3O_4$-carbon composite systems. The MOF thus obtained was annealed in a tube furnace under argon atmosphere at different temperatures. The MOF was kept into the furnace in a ceramic boat and slowly heated (rate 5° C./min) at a temperature of 500° C. and 600° C. in separate experiments for three to four hours and then cooled to room temperature.

Example 2: X-Ray Diffraction Pattern of the MOF

The XRD doublets of the metal organic framework at 2theta=9.29° and 9.69° match with the similar peaks of MIL-53. The XRD peak of the MOF at 2theta=10.84° corresponds to a similar peak of MIL-88 B. This XRD pattern in addition to the SEM images shown indicate that the Fe-containing MOF in the instant invention is MIL-53 along with an admixture of the polymorph MIL-88B. ICP analysis of the Fe-MOF shows that the % Fe content in the MOF is 19.8%, which is closer to the value of 21.9 expected for this MOF.

Example 3

8 mg of $Fe_3O_4$-carbon nanocomposite adsorbed 25 ml of $10^{-4}$(M) solution of methylene red and checked the adsorption by uv-vis spectrometer with 2 minutes time interval. It was been observed that 92% of the methylene red was adsorbed in just 14 minutes which is equivalent to 102 mg of methylene blue/g of nanocomposite.

Example 4

8 mg of $Fe_3O_4$-carbon nanocomposite adsorbed 25 ml of 1.31 mM solution of methylene blue and checked the adsorption by uv-vis spectrometer with 2 minutes time interval. It has been observed that 58% of the methylene blue was adsorbed in just 14 minutes which is equivalent to 66 mg of methylene blue/g of nanocomposite.

Example 5

5 mM solution of Phenol was taken with 8 mg of $Fe_3O_4$-carbon nanocomposite and UV spectra were observed with 20 minutes time interval. Phenol was adsorbed 34% within 80 minutes by the nanocomposite, which is 445 mg/g of the nanocomposites.

Example 6: Oil and Hydrocarbon Adsorption Using Fe3O4-Carbon Nanocomposite

For oil and hydrocarbon absorbance study, a Petri dish containing water was taken and 2.5 ml of oil or hydrocarbon was added to it. Due to their hydrophobic nature, oil and hydrocarbon float on surface of the water. 20 mg of hydrophobic (synthesized at 500° C. temperature) $Fe_3O_4$-carbon nanocomposite was then added to the water and the dish was shaken it gently for one time. The composite particles adsorbed the oil or hydrocarbon quickly from the surface of water. The oil adsorbed material was separated by magnetic field using a bar magnet. For recyclability test, the adsorbed oil was removed from the composite by sonication in ethanol, followed by washing with ethanol for 2 minutes under sonication. Finally the composite was collected and kept for drying in an oven at 60 degree Celsius and reused the same for next batch.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

We claim:

1. A process for the synthesis of a hydrophobic magnetic carbon-$Fe_3O_4$ nanocomposite, which is magnetically recoverable, and has a Brunauer-Emmett-Teller (BET) surface area of 437.8 $m^2$/g, wherein the process comprises:
   (a) subjecting a Fe-benzene dicarboxylic acid (BDC) metal organic framework to pyrolysis in an inert atmosphere at predetermined conditions to obtain the hydrophobic magnetic carbon-$Fe_3O_4$ nanocomposite, and
   (b) maintaining a pyrolysis temperature at 500° C. for 3 to 4 hours, wherein the hydrophobic magnetic carbon-$Fe_3O_4$ nanocomposite is floatable on water and selectively adsorbs oil and hydrophobic organic pollutants from a surface of the water, or maintaining the pyrolysis temperature at 600° C. for 3 to 4 hours to obtain the hydrophobic magnetic carbon-$Fe_3O_4$ nanocomposite that is dispersible into bulk water with stirring and selectively adsorbs water-soluble organic pollutants.

2. The process according to claim 1, wherein said hydrophobic magnetic carbon-$Fe_3O_4$ nanocomposite has magnetism value in the range of 26 emu/g to 49 emu/g.

3. The process according to claim 1, wherein the contact angle of the hydrophobic magnetic carbon-$Fe_3O_4$ nanocomposite is 143° (pH=7).

4. The process according to claim 1, wherein the hydrophobic magnetic carbon-$Fe_3O_4$ nanocomposite is in the form of rods.

* * * * *